United States Patent [19]

Pouli et al.

[11] 4,332,662
[45] Jun. 1, 1982

[54] ELECTROLYTIC CELL HAVING A DEPOLARIZED CATHODE

[75] Inventors: Dirk Pouli, Williamsville; Leo S. Melnicki, Niagara Falls, both of N.Y.; Eric J. Rudd, Painesville, Ohio

[73] Assignee: Hooker Chemicals & Plastics Corp., Niagara Falls, N.Y.

[21] Appl. No.: 166,422

[22] Filed: Jul. 7, 1980

[51] Int. Cl.³ .................. C25B 9/00; C25B 11/03; C25B 13/06; C25B 13/08
[52] U.S. Cl. .................. 204/265; 204/266; 204/283; 204/295; 204/296
[58] Field of Search .................. 204/265–266, 204/270, 283–284, 295–296, 128, 96, 98

[56] References Cited

U.S. PATENT DOCUMENTS

| | | | |
|---|---|---|---|
| 3,410,783 | 11/1968 | Tomter | 204/266 |
| 4,033,848 | 7/1977 | Strempel et al. | 204/284 |
| 4,062,753 | 12/1977 | Falvo | 204/296 X |
| 4,101,395 | 7/1978 | Motani et al. | 204/296 X |
| 4,181,592 | 1/1980 | Babinsky | 204/296 X |
| 4,244,793 | 1/1981 | Johnson et al. | 204/128 X |

FOREIGN PATENT DOCUMENTS

WO79/00688 9/1979 Sweden .................. 204/265

Primary Examiner—Delbert E. Gantz
Assistant Examiner—Donald R. Valentine
Attorney, Agent, or Firm—William G. Gosz

[57] ABSTRACT

An improved electrolytic cell for the electrolysis of alkali metal halide solutions to produce halides and alkali metal hydroxides is provided wherein current reductions are obtained by the passage of an oxidizing gas, such as oxygen, into a porous cathode to depolarize the cathode and eliminate the porduction of hydrogen. The cathode is provided with small diameter pores for diffusion of said oxidizing gas, and larger diameter pores or holes for liquid product flow through the cathode. The cathode, separator, and anode may be in direct contact with each other in a sandwich configuration, thus eliminating the need for a catholyte compartment and external $H_2O$ feed lines.

10 Claims, 5 Drawing Figures

ELECTROLYTIC CELL HAVING A DEPOLARIZED CATHODE

BACKGROUND OF THE INVENTION

The electrolysis of aqueous solutions of alkali metal salts has been commercially conducted for many years. Originally, electrolytic cells were constructed using liquid mercury as one electrode and graphite slabs as the other electrode. With the introduction of new materials for cathodes and anodes, the design of the cells incorporating these materials has improved both in terms of the efficiency of operation as well as the efficiency of construction. The introduction of cell separators, such as diaphragms and membranes, into the cell structure, provided design of electrolytic cells with separate catholyte and anolyte compartments which permit the isolation and collection of the products produced by the electrolysis reaction.

The products produced in the electrolysis of alkali metal halide salts are primarily chlorine, hydrogen and the alkali metal hydroxides. The commercial markets for these products are not always in the quantity as they are produced and considerable effort has been expended to design cells that will produce the most saleable ratio of products. In addition, the quantities of electrical energy used in the commercial operations are very large and considerable efforts to reduce the electrical consumption have been undertaken.

A typical reaction in a cell using sodium chloride as the alkali metal salt for illustration purposes is:

$$2NaCl + 2H_2O \rightarrow 2NaOH + H_2 + Cl_2 \qquad \text{Equation I}$$

In Equation I, the sodium chloride solution, upon electrolysis, yields sodium hydroxide, chlorine and hydrogen. The chlorine being released at the anode while the hydrogen is released at the cathode. By maintaining a high concentration of sodium chloride in the electrolyte, the solubility of the chlorine and hydrogen is reduced so that the gas will leave the electrolyte and can be collected.

It has been shown that the power requirements for such a cell can be decreased if a sufficient supply of oxygen is maintained at the cathode to prevent the evolution of hydrogen. Therefore, through the use of membrane or diaphragm type cells, the cathode can be isolated into its own compartment and oxygen passed into that compartment to reduce the amount of hydrogen generated as shown in Equation II.

$$4NaCl + 2H_2O + O_2 \rightarrow 4NaOH + 2Cl_2 \qquad \text{Equation II}$$

$$2H_2O + O_2 + 4e^- \rightarrow 4OH^- \qquad \text{Equation III}$$

Equation III above demonstrates the reaction for generating hydroxyl ions. The presence of these hydroxyl ions at the cathode will cause a reaction with the sodium ions to give sodium hydroxide, and will preclude the reaction of sodium with water to produce hydrogen gas and sodium hydroxide. Equations II and III are utilized in this application to illustrate how the novel electrolytic cell design of this invention operates to produce minimal quantities of hydrogen and utilizes the depolarized oxygen cathode to produce a relatively concentrated sodium hydroxide solution.

The evolution of electrolytic cells for the electrolysis of alkali halides is described in "Electrochemical Engineering" by C. A. Mantell (4th Edition, McGraw-Hill Book Co.). Additional modifications of cell design are also described in U.S. Pat. No. 3,859,196 to Reuthel et al., U.S. Pat. No. 4,025,405 to Dotson et al., as well as in U.S. Pat. No. 4,017,376 to Mose et al., and U.S. Pat. No. 4,181,776 to Lindstrom, which illustrate the current state of the art of electrolytic cells.

Various methods have developed using porous cathodes in combination with an oxidizing gas to depolarize the electrode in electrolytic cells. Juda, U.S. Pat. No. 3,124,520, as well as Gritzner, U.S. Pat. Nos. 3,926,769, 4,035,254 and 4,035,255, Dotson et al., U.S. Pat. No. 4,035,405 and Butler et al., Canadian Pat. No. 700,933, all disclose cells wherein the cathode is depolarized. In these patents, an anolyte compartment containing the liquid anolyte, is separated from a catholyte compartment containing liquid catholyte, by a membrane or diaphragm which permits the alkaline metal ions from the anolyte compartment to pass into the catholyte compartment. In the prior art methods, the cathode is porous, and oxygen or an oxidizing gas is brought in contact with the cathode to cause depolarization at the cathode surface. The prior art cells which utilize depolarized cathodes require a distinct intermediate catholyte compartment which is not required in the present invention. In processes employing such cells, additional water is required in the catholyte compartment, and either pure water or a solution of the alkali metal hydroxide must be added in order to maintain the proper level of the catholyte in the catholyte compartment.

It is thus an object of this invention to permit the construction of an electrolytic cell of more compact design in comparison to conventional cells by eliminating the requirement for a separate catholyte compartment and external H₂O feed lines associated with the catholyte compartment.

Another object of this invention is to reduce the electrical energy needed for the electrolysis of alkali metal halide solutions in an electrolytic cell.

A further object of this invention is to reduce the liquid flooding problems associated with prior art air cathodes.

A still further object of this invention is to provide an electrolytic cell capable of producing an alkali metal hydroxide solution of relatively high concentration and purity.

SUMMARY OF THE INVENTION

An improved electrolytic cell for the production of halogen and alkaline metal hydroxide has now been developed. The cell comprises an anolyte compartment suited to contain an anolyte, such as an aqueous solution of an alkaline metal halide, e.g., sodium chloride, a cell separator interposed between the anode and cathode and defining the boundary of the anolyte compartment, an oxidizing gas compartment adapted to contain an oxidizing gas and to permit withdrawal of liquid product, and, optionally, a catholyte compartment situated between the anolyte and oxidizing gas compartments, and adapted to contain cell liquor. The cell separator may be either a diaphragm or a cationic ion exchange membrane, e.g. of the NAFION variety, adapted to permit the passage of alkali metal ions from the anolyte compartment to the catholyte compartment.

A cathode porous to gas flow and having a series of openings through the cathode to allow for liquid product flow therefrom defines the boundary of the oxidizing gas compartment. Into the oxidizing gas compartment is fed oxygen, or a gas having oxidizing properties, such as air, to pass through the porous cathode to depolarize the cathode. The series of openings in the porous cathode is designed to allow the alkali metal hydroxide produced to flow out of the cathode into the oxidizing gas compartment. This cathode design conveniently permits the assembly of the anode, cell separator and cathode in a single unit or composite configuration, each of the members being in contact with the next adjacent member, thus eliminating the conventional catholyte compartment and providing the capability of elevated pressure operation.

Electrolysis occurs in this cell with the halogen being produced in the anolyte compartment and collected therefrom. The separator allows sufficient water to be transported to allow the reaction to occur within the porous cathode, that reaction involving the passage of oxygen into the cathode and reacting with the water as illustrated by Equation III. The separator also allows the passage of the cations of the electrolysis solution, e.g. Na+ when a sodium chloride solution is used, and these cations react with the hydroxyl ions produced to form the alkali metal hydroxide. In this embodiment of the present invention, it is possible to eliminate the need for water to be fed to a separate catholyte compartment. Alternatively, water may be added to the oxidizing gas compartment with the oxidizing gas to provide the desired alkali metal hydroxide concentration.

BRIEF DESCRIPTION OF THE DRAWINGS

The accompanying drawings further illustrate the invention.

DESCRIPTION OF THE PREFERRED EMBODIMENTS

Figure 1:
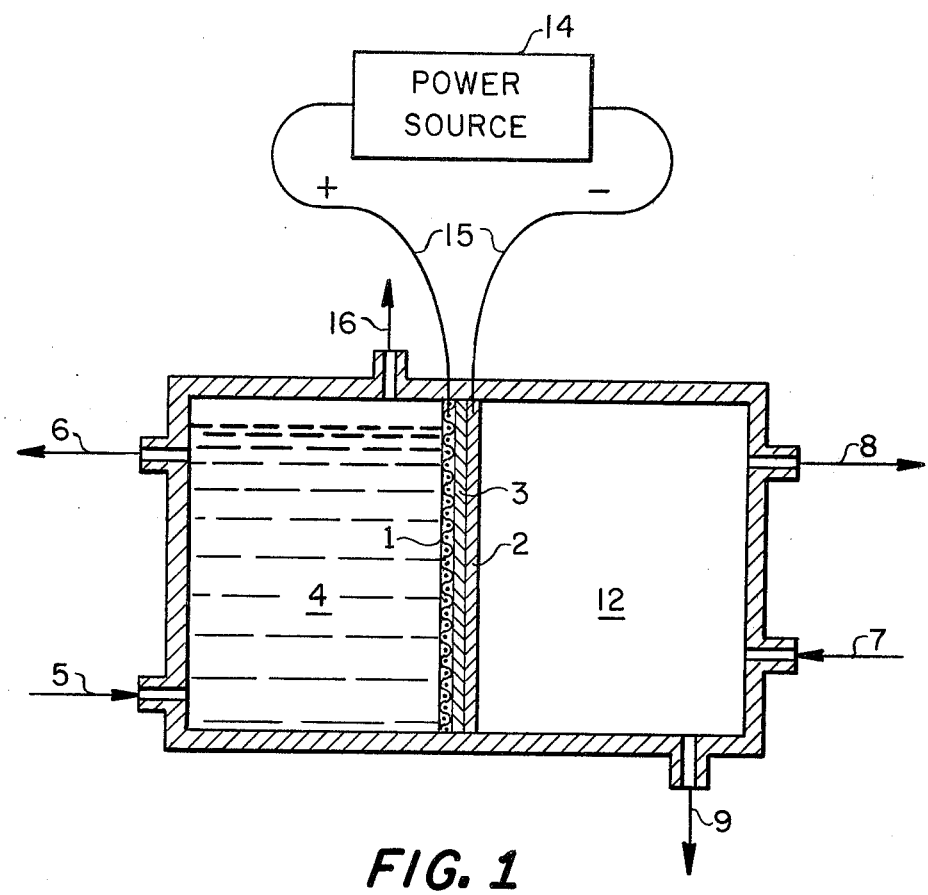
FIG. 1 depicts a cross-sectional view of one embodiment of the invention illustrating the internal construction of the cell.

The electrolytic cell of FIG. 1 includes an anolyte compartment 4 with the anode 1 defining the boundary of the anolyte compartment and being placed in contact with the separator 3. The anolyte compartment 4 contains the anolyte, such as a sodium chloride solution, which enters the anolyte compartment through inlet 5, and contains an outlet 6 for removal of the anolyte. The anolyte compartment also contains exit 16 which is the exit for the halogen gas produced in the compartment. The oxidizing gas compartment 12 contains the cathode 2 which is shown placed in contact with separator 3. The oxidizing gas compartment also contains inlet 7 for the flow of oxidizing gas, with outlet for the gas 8. Liquid product outlet 9 is shown positioned for the exit of the alkali metal hydroxide, such as sodium hydroxide, produced in the gas compartment. The power source for the cell 14 is connected by cables or busbars 15 to the corrresponding anode 1 and cathode 2.

Figure 2:
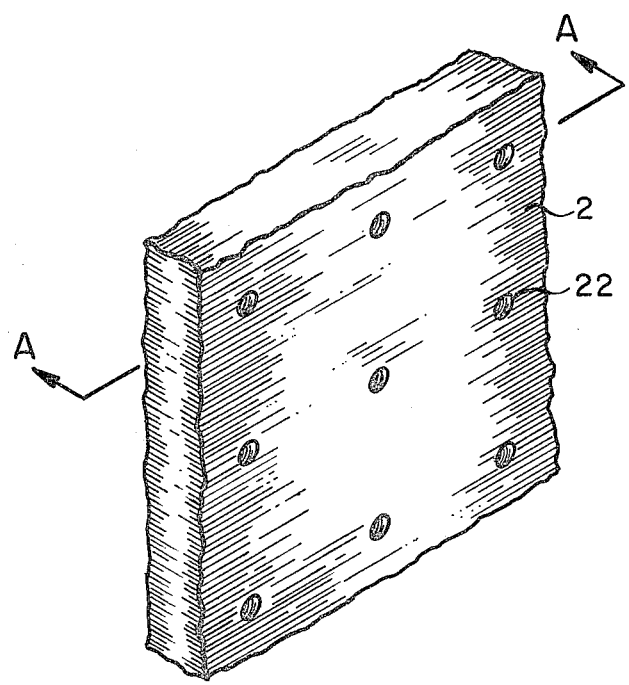
FIG. 2 is an enlarged section of the cathode showing a series of circular openings for liquid product flow.
Figure 3:
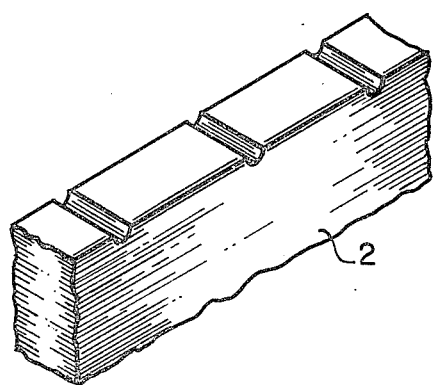
FIG. 3 is a cross-sectional view along line AA showing the liquid product flow openings passing through the cathode.

FIGS. 2 and 3 are enlarged, partial views of the porous cathode 2 and show circular openings or holes 22 placed in the cathode for the flow of liquid product, for example, sodium hydroxide, from the reaction zone into the oxidizing gas compartment 12. FIG. 3 shows a section of FIG. 2 along line AA, and further illustrates the openings through the porous cathode for liquid product flow.

Figure 4:
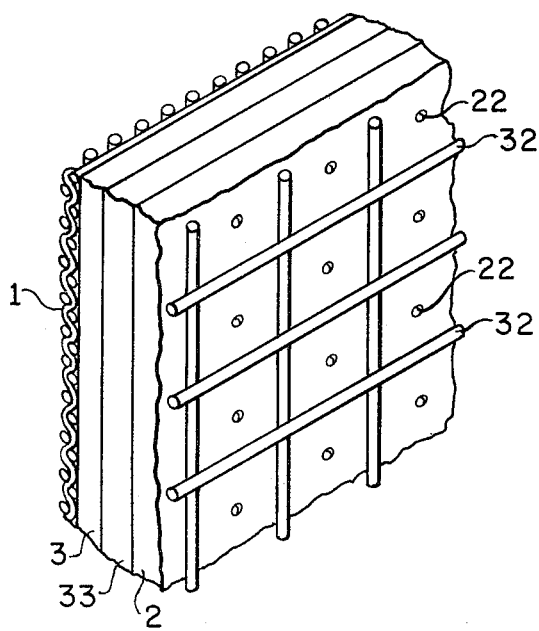
FIG. 4 shows another electrode assembly with a current collector placed on the cathode surface.

FIG. 4 shows an enlarged cross-sectional view of the anode 1, cathode 2, and separating members 3 and 33, as a unit, the individual members being in contact with the next adjacent member. Placed upon the rear surface of and contacting the cathode is a current collector 32.

Figure 5:
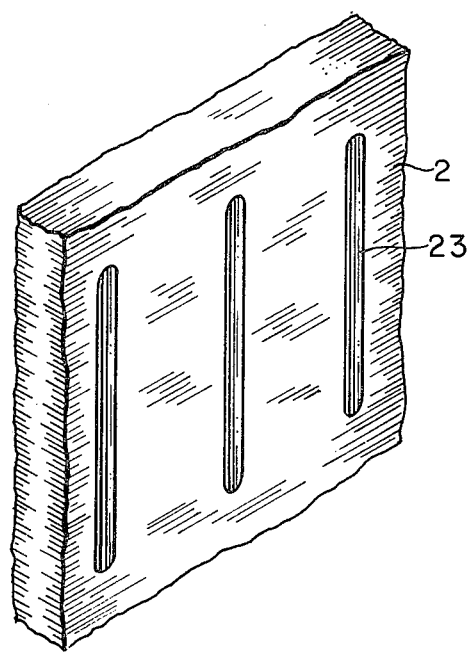
FIG. 5 is an enlarged section of the cathode similar to FIG. 2 with the openings depicted as elongated channels.

FIG. 5 also shows an enlarged, partial view of an alternate porous cathode embodiment wherein elongated channels or slots 23, rather than circular openings, extend through the cathode for liquid product flow.

The anodes which can be used in this invention are known to those skilled in the art. Basically, the anode may comprise an electrically conductive, electrolyte-resistant material, such as, for example, a valve metal such as titanium, tantalum, or alloys thereof, containing on its surface an electrically conductive, electrocatalytic coating which may comprise a noble metal, noble metal oxide or other suitable materials. The physical form of the anode is generally a foraminated sheet or mesh of the valve metal coated with the electrocatalytic coating. The anode must have a sufficient number of openings to allow the electrolyte to reach the separator 3. The anolyte compartment 4 must be of sufficient size to allow an adequate quantity of the brine solution to enter, and of a design wherein the halogen produced can be collected and leave the anolyte compartment through exit 16. The brine enters the anolyte compartment through inlet 5 and exits through outlet 6, and may be recirculated by means not shown.

The separator 3, which separates the anode from the cathode and can be in contact with each of them as shown, is preferably a cationic exchange material having the ability to allow the alkali metal ion to pass through the membrane and having sufficient water transport properties to permit water molecules to reach the cathode. A typical separator is a NAFION 031 membrane which is manufactured by the E.I. duPont de Nemours and Company, Wilmington, Del. Suitable membranes and their method of preparation are described in more detail in British Pat. No. 1,184,321, and U.S. Pat. No. 3,282,875, the pertinent disclosures of which are incorporated herein by reference. Other cationic exchange materials can be substituted and used as separators between the cathode and anode in this invention. The membrane must be capable of allowing sufficient water to be transported through it as water of hydration, in association with migrating sodium ions, and through electrode osmotic transfer.

The cathode 2 is a conventional electrode with, for example, a catalyst layer of platinum black bonded with TEFLON to a supporting metallic screen or foraminous plate, such as nickel. The openings or holes in the electrode are placed in a pattern to create an open area in the electrode of from about 2% to about 80% open area, and preferably from about 5% to about 25% open area. In general, the size and shape of the individual openings may vary within wide limitations, provided that the openings are large enough to prevent liquid flooding of the electrode, yet small enough to prevent physical leakage of electrolyte. An essential feature of the openings, however, is that they connect the opposite surfaces of the cathode to permit liquid product flow through the cathode.

Alternatively, regions of greater hydrophilicity than the remainder of the electrode may be suitably utilized instead of, or in combination with, physical openings. Such regions may be formed of suitable hydrophilic materials which are easily wettable by water, such as polysulfone sulfonate. Thus, when used in this specification and claims, the term "openings" denotes either physical openings, regions of increased hydrophilicity or any combination of the above.

There may also be placed on the surface of the cathodes, opposite to the surface in contact with the separator, indentations placed from opening to opening to assist in the flow of the liquid alkali hydroxide product from the cathode surface to a collector area at the base of the cell. A current collector 32, such as a wire mesh, may be placed against the outer surface of the cathode to assist in the electrical current distribution along this surface.

The alkali metal hydroxide or cell liquor formed within the cathode leaves through the openings in the cathode, collects at the base of the cell, and exits through pipe 9 for subsequent use by the cell operator. The oxygen or oxidizing gas is fed into the gas compartment 12 through inlet 7 and exits through exit 8 and may be collected by a collection means not shown in the drawing. The oxygen stream may or may not have moisture added thereto.

An additional technique for control of the cell performance is to insert between separator 3 and cathode 2 an additional separator material. This additional separator material may be a separate layer interposed between membrane and cathode, or may be physically part of the membrane unit, but having differing properties, e.g. chemical modification of the membrane surface to create a sandwich effect. In FIG. 4, this is illustrated by the anode 1 being placed next to the separator 3, and interposed between cathode 2 and separator 3 is the additional separator material 33. Possible additional separator materials include zirconium oxide papers, which are papers composed of zirconia fibers having a mean diameter of about three microns and containing no organic binder. This type of material is approximately 90 to 95 percent porous and has excellent resistance to alkaline metal hydroxides even at elevated temperatures. Materials such as woven PVC cloth, polypropylene screens, porous nickel materials, alumina paper or ceramic cloth can also be utilized as separator materials.

The alkali metal halide solution introduced into the anolyte compartment may vary widely in concentration from about 40 grams per liter to about 300 g/L, but is preferably maintained at from about 100 g/L to the saturation concentration of the alkali metal halide. The anolyte may be recirculated out of the anolyte compartment in order to allow additional alkali metal halide to be introduced into the aqueous solution to restore the concentration to the desired level.

The electrolysis reactions generally conform to Equations II and III, as stated above, and as the sodium ion, with its water of hydration, moves through the separator, sufficient water molecules will be carried along, so that Equation III may occur in the presence of the oxygen to produce the hydroxyl ion which reacts with the sodium ion to produce the sodium hydroxide which will flow to the openings in the cathode and flow through the passageway and be withdrawn from the gas chamber.

The gas flowing into the gas chamber may be pure oxygen, an oxidizing gas, or air flow if the oxygen level is sufficient.

The use of oxygen to depolarize the cathode allows for the voltage reduction in cell operation. The following illustrates this effect in a laboratory cell:

$$\Delta V = (V_a - V_o)$$

where $V_a$ is the voltage with no oxygen flow to the cathode and with hydrogen generation, and $V_o$ is the voltage with oxygen flow to the cathode.

The following example is merely intended to further illustrate the invention without imposing any limitations thereby.

EXAMPLE

A laboratory cell was constructed in accord with this invention to produce chlorine and sodium hydroxide. *

Anode: $RuO_2$ coated titanium screen
Cathode: Porous silver/copper
Openings: 0.035" diameter, 22% open area
Separator: NAFION 031 ion exchange membrane
Voltage: 2.04 volts
Current Density: 1 amp/in$^2$
Temperature: 70° C.
Brine Composition: 100 gm/l NaCl
Sodium Hydroxide Yield: 293 gm/l NaOH

*Measured parameters represent the numerical average of three experiments.

Although the invention has been described with reference to certain preferred embodiments thereof, it is not to be so limited since changes and alterations may be made therein which are within the full and intended scope of the appended claims.

What is claimed is:

1. An electrolytic cell for the electrolysis of an aqueous solution of an alkali metal halide comprising, in combination, an anolyte compartment for retaining an alkali metal halide solution and halogen collection, an oxidizing gas compartment consisting essentially of an enclosed space having means for introducing and withdrawing an oxidizing gas and outlet means for removing liquid alkali metal hydroxide product, and an electrode assembly disposed within said cell between said anolyte compartment and said oxidizing gas compartment, said electrode assembly comprising an anode, a gas permeable porous cathode for the diffusion of the oxidizing gas into said cathode, and a cell separator disposed between and in contact with both the cathode and anode, said cathode having a multiplicity of interconnecting openings permitting the passage of liquid alkali metal hydroxide product through the cathode into the oxidizing gas compartment.

2. The cell of claim 1 wherein the cell separator is a cation exchange membrane.

3. The cell of claim 2 wherein the cell separator is a perfluorosulfonic acid membrane.

4. The cell of claim 1 wherein the porous cathode has an open area of from about 2% to about 80%.

5. The cell of claim 4 wherein the open area of the porous cathode is from about 5% to about 25%.

6. The cell of claim 1 wherein a current collector is placed against the outer surface of the porous cathode.

7. The cell of claim 1 wherein the alkali metal halide is sodium chloride and the liquid product is sodium hydroxide.

8. An electrolytic cell for the electrolysis of an aqueous solution of an alkali metal halide comprising, in combination, an anolyte compartment for retaining cell electrolyte and halogen collection, an oxidizing gas compartment for receiving liquid alkali metal hydroxide product and adapted to contain an oxidizing gas, and an electrode assembly disposed within said cell between said anolyte compartment and said oxidizing gas compartment, said electrode assembly comprising an anode, a cell separator in contact with said anode, an additional separator material of high porosity in contact with the cell separator, and a cathode in contact with the additional separator material, said cathode having a multiplicity of interconnecting openings permitting the passage of liquid alkali metal hydroxide product through the cathode into the oxidizing gas compartment.

9. The cell of claim 8 wherein the additional separator material has a porosity of from about 90% to about 95%.

10. The cell of claim 8 wherein the additional separator material is selected from the group consisting of zirconium oxide papers, woven polyvinyl chloride cloth, polypropylene screen, porous nickel, alumina paper and ceramic cloth.

* * * * *